United States Patent [19]
Ose

[11] 3,876,767
[45] Apr. 8, 1975

[54] TREATMENT OF SWINE DYSENTERY WITH APRAMYCIN

[75] Inventor: Earl E. Ose, Indianapolis, Ind.

[73] Assignee: Eli Lilly and Company, Indianapolis, Ind.

[22] Filed: Feb. 4, 1972

[21] Appl. No.: 223,726

[52] U.S. Cl.................................. 424/118; 424/116
[51] Int. Cl............................................ A61k 21/00
[58] Field of Search............................ 424/116, 118

[56] References Cited
UNITED STATES PATENTS
3,691,279  9/1972  Thompson........................ 424/116

Primary Examiner—Sam Rosen
Attorney, Agent, or Firm—Joseph A. Jones; Everet F. Smith

[57] ABSTRACT

Administration of the antibiotic apramycin or its physiologically acceptable salts to swine of weaning age or older increases the swine's growth and feed efficiency, and prevents and cures swine salmonellosis and swine dysentery.

5 Claims, No Drawings

TREATMENT OF SWINE DYSENTERY WITH APRAMYCIN

BACKGROUND OF THE INVENTION

Apramycin is an antibiotic, derived from fermentation, of as yet unknown structure. Apramycin has been thoroughly characterized by taxonomic description and physical properties. At one time, apramycin was known as nebramycin factor II. Nebramycin as a well-known complex of eight different antibiotic factors.

Swine dysentery and swine salmonellosis are two of the major diseases which adversely affect swine performance. Swine dysentery has been believed to be caused by *Vibrio coli*. Recent reports indicate that a spirochete may play a role in swine dysentery. The disease first was observed in the Midwestern United States in approximately 1,918, and has spread to cover all of the swine-raising areas of the U.S. It affects pigs of all ages, but is most often observed in feeder pigs (pigs from weaning to approximately 21 weeks old weighing from approximately 20 to approximately 200 pounds). The disease often appears in a swine herd when animals are brought into the herd from elsewhere, but it may remain endemic within a herd and from time to time break out to become epidemic.

Swine dysentery has been successfully treated with the organic arsenical compounds. Toxicity of course is a problem with all of the arsenicals, so that low doses must be used. Some antibiotics have been used with some success for the control of swine dysentery. Bacitracin, streptomycin, neomycin, clortetracycline, and tylosin have all been successfully used in some instances, but have failed in other instances. The nitrofurans have also been used successfully.

Salmonellosis of swine is an extremely common disease, which is apparently caused by a range of salmonella species. *Salmonella choleraesuis* and *S. typhisuis* are host-adapted to swine; *S. typhimurium* and *S. derby* also are often the causative organisms of salmonellosis epidemics. Salmonellosis can occur in swine of all ages, but it appears most often in swine several weeks to several months of age.

Salmonellosis has been treated with chloramphenicol, neomycin, and the nitrofurans. Pigs which have recovered from salmonellosis are likely to remain as carriers of salmonellosis for some time. Also, such pigs frequently fail to make profitable gains even after recovery. Therefore, such pigs are frequently destroyed.

SUMMARY

Administration of the antibiotic apramycin or its physiologically acceptable salts to swine at rates of from about 0.5 to about 500 mg./kg./day increases the swine's growth and feed efficiency, and prevents and cures swine dysentery and salmonellosis.

DESCRIPTION OF THE PREFERRED EMBODIMENT

My invention is a method of promoting the growth of swine, and preventing and curing swine dysentery and salmonellosis, which comprises the administration of from about 0.5 mg./kg./day to about 500 mg./kg./day of apramycin or its physiologically-acceptable salts to the swine. The most desirable rates, the lengths of time during which apramycin should be administered, the times when apramycin administration should begin, and the preferred methods of administration vary depending on the result which is most desired and the severity of the conditions of the swine.

Apramycin and its production are described by Thompson et a U.S. Pat. No. 3,691,279. The descriptions of apramycin and its manufacture in that application are herein incorporated by reference. Apramycin is there referred to as "nebramycin II."

Apramycin can form acid addition salts. Such non-toxic acid addition salts, as is usual with the salts of antibiotics, can be used as well as the base compound for the practice of my method. It seems probable that the animal to which the apramycin is given degrades the acid addition salt to form the base compound. Whatever the mechanism, it is well known that acid addition salts of antibiotics are effective for treatment of the animals. For example, suitable salts can be formed by reacting the base compound with acids such as sulfuric acid, nitric acid, phosphoric acid, metaphosphoric acid, methylsulfonic acid, acetic acid, propionic acid, butyric acid, nitrous acid, sulfurous acid, hydrochloric acid, hydrobromic acid, hyposulfurous acid, benzoic acid, and lauryl sulfuric acid. In this application, the term apramycin will be used to include apramycin and its physiologically acceptable salts.

The growth of swine can be promoted by means of the administration of apramycin to the swine at any time during their growing period of life. That period begins when the swine are weaned at about 5 weeks of age and weigh about 20 pounds. The pigs are exposed to dry feed from their second week of life, but are not weaned until they are accepting about one pound of dry feed per day.

The growth-promoting rates of apramycin are from about 0.5 to about 200 mg./kg./day. The preferred range of apramycin rates for growth promotion is from about 0.5 mg./kg./day to about 15 mg./kg./day. A highly preferred method of administration of apramycin for growth promotion varies the rates of apramycin during the pig's life. For example, from the fifth to the tenth week of age, apramycin is administered at the rate of 10 mg./kg.; from the 11th through the 16th week of life, at 5 mg./kg.; and from the 17th through the 21st week of life, at 2 mg./kg.

Tests have proven the efficacy of apramycin in promoting swine growth. In all of these tests, the swine were fed diets which exemplify the best economical practice in the pig growing industry. The method of growth promotion which I have invented does not depend upon a special diet for its benefits. So long as the diet offers the pigs adequate nutrition and energy for their needs, my method will be effective.

Example 1

One hundred twenty pigs, averaging 20 pounds body weight, were allotted to 20 pens of 6 pigs each. The pigs were first allotted on the basis of age, sex, and litter to outcome groups, and the pigs allotted to pens from the outcome groups at random. All of the pigs were housed in a heated barn in concrete-floored pens. Feed and water were provided ad lib at all times.

Five treatments were given, with four pens being allotted to each treatment. The table below shows the treatments.

Table I

| Treatment | Apramycin Rate | | |
|---|---|---|---|
| | 20–40 lb. | 40–80 lb. | 80–200 lb. |
| 1 | 0 | 0 | 0 |
| 2 | 7 mg./kg./day | 3.5 mg./kg./day | 1.4 mg./kg./day |
| 3 | 7 mg./kg./day | 1.4 mg./kg./day | 0.7 mg./kg./day |
| 4 | 3.5 mg./kg./day | 3.5 mg./kg./day | 1.4 mg./kg./day |
| 5 | 3.5 mg./kg./day | 1.4 mg./kg./day | 0.7 mg./kg./day |

In each treatment, apramycin was supplied mixed in the feed in the form of the lauryl sulfate salt.

The table below shows the results of the experiment.

Table II

| | 20 – 80 lb. | | 80 – 200 lb. | | Overall | |
|---|---|---|---|---|---|---|
| Treatment | ADG[1] | Efficiency[2] | ADG | Efficiency | ADG | Efficiency |
| 1 | 0.72 | 0.40 | 1.56 | 0.30 | 1.19 | 0.32 |
| 2 | 0.99 | 0.43 | 1.56 | 0.30 | 1.30 | 0.34 |
| 3 | 0.97 | 0.42 | 1.65 | 0.31 | 1.33 | 0.34 |
| 4 | 0.94 | 0.43 | 1.61 | 0.31 | 1.29 | 0.34 |
| 5 | 0.92 | 0.43 | 1.63 | 0.31 | 1.30 | 0.34 |

[1]average daily gain
[2]pounds gain/pound feed

For the entire experiment, all apramycin-fed pigs grew more rapidly and more efficiently than did the controls.

Example 2

Apramycin lauryl sulfate was evaluated for growth promotion in weanling cross-bred pigs. Forty pigs were allotted to pens of ten, by the method described in Example 1. The pigs averaged 19 pounds body weight at the start of the experiment. The pigs had been weaned at 4 to 5 weeks of age and maintained on an 18 percent protein starter ration for approximately a week before the experiment was started. The housing and feeding conditions were as described in Example 1. The experiment was carried on for 28 days, during which the pigs gained approximately 20–25 pounds.

Table III

| Treatment | ADG | Efficiency |
|---|---|---|
| Basal ration | 0.74 | 0.562 |
| 7 mg./kg. apramycin | 0.86 | 0.553 |

The basal-fed pigs performed exceptionally well in this experiment. The addition of apramycin to the diet increased average daily gains significantly at the 10 percent level, but did not have any effect on feed efficiency. The pigs were observed for 30 days after the end of the feeding experiment, in order to detect any adverse effects from the feeding of apramycin. No such adverse effects were found.

Example 3

This experiment consisted of 44 weanling pigs averaging 23 pounds body weight when the test began. The test ran for four weeks. The first two replicates, consisting of 24 pigs, were placed on the test six weeks before the third and fourth replicates, which consisted of 20 pigs. The pigs were allotted to outcome groups and to pens as described in Example 1, and were housed and fed as described in that example. The results of the test are described below.

Table IV

| Treatment | ADG | Efficiency |
|---|---|---|
| Basal ration | 0.57 | 0.46 |
| 7 mg./kg./day apramycin lauryl sulfate | 0.87 | 0.56 |

The addition of apramycin to the basal diet significantly increased both daily gain and feed efficiency. The increase in daily gain is especially outstanding here, amounting to a 52.6 percent improvement. Again, no adverse effects were observed during the experiment or during a 30-day observation period following the experiment.

The continuous feeding of apramycin for growth promotion also prevents swine dysentery and salmonellosis. Even though apramycin is not administered for growth promotion, it can be used for prevention and cure of swine dysentery and salmonellosis. Apramycin has proved to be effective against the causative organisms of such diseases.

Apramycin is effective *in vitro* against a large number of salmonella isolates of porcine origin. I have tested it against 53 isolates, obtained from Regional Diagnostic Laboratory, Peoria, Illinois. Minimum inhibitory concentrations (M.I.C.) were determined by the standard tube dilution method following a 24-hour incubation period.

| Salmonella Species | M.I.C., mcg./ml. | Number of Isolates |
|---|---|---|
| S. anatum | 1.56 | 1 |
| | 3.12 | 1 |
| S. choleraesuis, var. Kunzendorf | 1.56 | 3 |
| | 3.12 | 19 |
| | 6.25 | 2 |
| | 12.5 | 1 |
| | 50 | 1 |
| S. decatur | 3.12 | 1 |
| S. degania | 1.56 | 1 |
| S. derby | 1.56 | 1 |
| | 3.12 | 2 |
| | 6.25 | 1 |
| | 25 | 1 |

-Continued

| Salmonella Species | M.I.C., mcg./ml. | Number of Isolates |
|---|---|---|
| S. enteritidis | 3.12 | 2 |
| S. koltbus | 1.56 | 1 |
| S. montevideo | 3.12 | 2 |
| S. newport | 3.12 | 1 |
| S. saint-paul | 1.56 | 1 |
| S. typhimurium | 1.56 | 3 |
|  | 3.12 | 6 |
| S. typhimurium var. Copenhagen | 1.56 | 2 |

I have also tested apramycin in vitro against several isolates of *Vibrio coli*.

| Vibrio coli | 6.25 | 3 |
|---|---|---|
|  | 3.12 | 4 |

The best times of administration of apramycin for prevention and cure of swine dysentery and salmonellosis will depend in large part on the past experience of the individual swine herd. Dangerous epidemics of swine dysentery and salmonellosis are likely to occur during the first several weeks after the swine are weaned. Outbreaks are also likely at times of stress on the swine, such as when they are shipped or when they are moved from an indoor pig nursery out onto pasture. Outbreaks are also likely when new pigs are imported into the herd. Therefore, apramycin can logically be used at such times for prevention of salmonellosis and swine dysentery.

Further, at times when outbreaks of dysentery and salmonellosis are to be expected in a swine herd, the grower might logically assume that all of his swine are in fact ill with salmonellosis or dysentery and begin treatment at such times, whether clinical signs are evident or not. After an outbreak of salmonellosis or dysentery has been controlled, the grower might beneficially continue preventive administration of apramycin for a time in order to guard against a recurrence or relapse of the disease, either in individual pigs or in the herd at large.

The range of apramycin rates, identical to the growthpromoting rates, which is effective for the prevention of salmonellosis and dysentery of swine is from about 0.5 mg./kg./day to about 200 mg./kg./day. The preferred range of rates is from about 0.5 mg./kg./day to about 15 mg./kg./day.

If apramycin is to be used for the treatment of swine dysentery and salmonellosis, the range of treatment rates is from about 1.0 mg./kg./day to about 500 mg./kg./day. The preferred range is from about 2.5 mg./kg./day to about 100 mg./kg./ day.

Whether apramycin is used for treatment or prevention of disease, the best rate for a given herd must be chosen by experience. Disease outbreaks often recur in consecutive farrowings on a farm. Therefore, the grower is able to predict the severity of his disease problem and from that, the approximate dose of apramycin needed.

It is important to begin the administration of apramycin for treatment as quickly as possible after disease is observed in the herd. Some of the pigs typically break out with overt symptoms before the bulk of the herd does and so it is generally possible to interrupt the course of the disease before too much loss is incurred.

Apramycin should be administered for prevention of swine salmonellosis and dysentery throughout the time when such diseases are to be feared. Experience will indicate that in many cases administration for a few weeks during periods of stress is adequate. When apramycin is adminsitered to treat swine already clinically ill with those diseases, it should be administered daily for from about one to about 14 days, depending on the severity of the outbreak and the other types of stress which the pigs are undergoing.

I have proved the efficacy of my method by conducting controlled tests. The group of tests which are first reported below illustrate the efficacy of apramycin in preventing swine dysentery.

The procedure used in these tests was essentially the same. Weaned pigs weighing about 22–28 pounds were allotted into treatment groups by a process described in Example 1 above.

In each of the tests, the swine dysentery challenge was provided by feeding each pig a dose of 10–15 ml. of colon scrapings from pigs with acute swine dysentery. The original inoculum had been a colon removed from a pig with dysentery from a farm where swine dysentery was epidemic. That colon had been used to infect a group of pigs at my laboratory, which pigs were maintained as a source of swine dysentery infection.

Weight gain and mortality were observed during the tests. Pigs which died during the test were necropsied, and the survivors were killed and necropsied at the end of the test. The pig's colons were removed at necropsy and examined for the presence of colon lesions.

Example 4

The apramycin-treated pigs in this experiment were fed apramycin mixed in their feed for 15 days. The challenge was administered to all of the pigs two days after the beginning of apramycin administration. The treatment groups received apramycin at the following rates, with the following results.

Table V

| Treatment | Gain/Pig, Lbs. | Mortality | Colon Lesions |
|---|---|---|---|
| None | −2.2 | 2/12 | 11/12 |
| About 7 mg./kg./day, lauryl sulfate | 16.4 | 0/12 | 3/12 |
| About 14 mg./kg./day, apramycin base | 18.0 | 0/12 | 0/12 |

The infected control pigs began to scour by the twelfth day of the test and continued to do so until termination. The pigs on the lower rate of apramycin showed some signs of dysentery by day 24, 9 days after the end of apramycin administration. None of the apramycin-treated pigs died. Weight-gain data reflect the incidence of dysentery; the apramycin-treated pigs uniformly made good gains; the untreated pigs averaged a weight loss over the four weeks of the trial.

Example 5

The infection in this test was much less virulent than was the infection in Example 4.

Feeding of apramycin-medicated feed to the medicated treatment groups was begun 3 days before the swine dysentery challenge was administered to all of the pigs. Apramycin-medicated feed was offered to groups 2 and 3 until the trial was terminated after 41 days. Treatment groups received apramycin, as the lauryl sulfate, with the following results.

Table VI

| Treatment | Gain/Pig Lbs. | Mortality | Colon Lesions |
|---|---|---|---|
| None | 25.0 | 1/11 | 1/11 |
| About 3.5 mg./kg./day | 38.2 | 0/12 | 0/12 |
| About 7 mg./kg./day | 36.4 | 0/12 | 0/12 |

One pig in the control group died from a cause which was not swine dysentery and that pig was ignored in the data.

Example 6

In this test, the challenge was administered on the third day after the start of administration of apramycin to the treated groups. The 7 mg./kg./day treatment was ended and the pigs were slaughtered after 24 days; the other treated groups were kept on the apramycin-medicated feed until the trial was terminated after 30 days. The treated groups received apramycin as the lauryl sulfate, with the following results.

Table VII

| Treatment | Gain/Pig, Lbs. | Mortality | Colon Lesions |
|---|---|---|---|
| None | 9.4 | 4/10 | 9/10 |
| About 1.8 mg./kg./day | 25.3 | 1/12 | 6/12 |
| About 3.5 mg./kg./day | 31.2 | 0/12 | 0/12 |
| About 7 mg./kg./day | 23.4 | 0/12 | 0/12 |

Obviously the infection of swine dysentery in this test was highly virulent, as evidenced by the deaths of 40 percent of the infected control pigs. Severe dysentery occurred in treatment 2, which received the lowest rate of apramycin, and one of the pigs in this group died. However, all of the treated groups maintained weight gain throughout the 4-week trial period.

Example 7

This test included pigs from three different sources. The pigs used weighed about 40 pounds when the test began. The test ran for 35 days. Apramycin was administered to the pigs in the three treated groups throughout the trial. The swine dysentery challenge was administered as in the three examples above..

The treatment groups received apramycin as the sulfate salt in their feed, with the following results.

Table VIII

| Treatment | Gain/Pig, Lbs. | Mortality | Colon Lesions |
|---|---|---|---|
| Source No. 1 Pigs | | | |
| None | 18.4 | 8/12 | 1/4[2] |
| About 1.8 mg./kg./day | 43.9 | 1/12 | 3/11[2] |
| About 3.5 mg./kg./day | 46.4 | 0/11 | 0/5[1] |
| About 7 mg./kg./day | 50.3 | 0/12 | 0/6[1] |
| Source No. 2 Pigs | | | |
| None | −8.7 | 8/12 | 2/4[2] |
| About 1.8 mg./kg./day | 31.5 | 0/12 | 3/12 |
| About 3.5 mg./kg./day | 32.7 | 1/12 | 0/11[2] |
| About 7 mg./kg./day | 52.4 | 0/12 | 1/12 |
| Source No. 3 Pigs | | | |
| None | 20.9 | 6/12 | 2/6[2] |
| About 1.8 mg./kg./day | 32.0 | 1/12 | 0/11[2] |
| About 3.5 mg./kg./day | 57.4 | 0/12 | 0/6[1] |
| About 7 mg./kg./day | 52.4 | 0/12 | 1/6[1] |

[1] 6 of the pigs were not necropsied but were held to market weight.
[2] lesion inspections were made only on the surviving pigs from the treatment group.

The infection in this test was obviously very severe. Despite the virulence of the challenge, the pigs which were medicated with apramycin succeeded in making excellent weight gains, and lost only three pigs from the total of 107 pigs which were fed apramycin. In contrast, 22 of the 36 control pigs died from swine dysentery during the test.

I have also tested apramycin in the treatment of swine which are clinically ill with swine dysentery. The following examples are reports of such tests.

Example 8

Forty-eight feeder pigs, weighing about 32 pounds each, from each of two sources were allotted into treatment groups of six pigs each, replicated twice. Pigs from each source were kept separate. All the pigs were experimentally infected with colon scrapings as was explained before Example 4.

The pigs in apramycin-treated groups received apramycin in their drinking water as shown below. Medication was begun in each case at the time when the pigs indicated by a bloody diarrhea that they were becoming clinically ill with swine dysentery. Treatment was continued for 5 days. If signs of dysentery recurred, the pigs were given a second, 5-day treatment.

| Treatment | First Treatment | Second Treatment |
|---|---|---|
| 1 | None | None |
| 2 | About 4 mg./kg./day (Day 8 – Day 13) | 10 mg./kg./day (Day 28 – Day 33) |
| 3 | About 20 mg./kg./day (Day 9 – Day 14) | 20 mg./kg./day (Day 30 – Day 35) |
| 4 | About 40 mg./kg./day (Day 9 – Day 14) | 20 mg./kg./day (Day 36 – Day 41) |

The results of the tests for the pigs from source No. 1 follows:

Table IX

| Treatment | Gain/Pig, Lbs. | Total Mortality |
|---|---|---|
| 1 | 20.6 | 8/12 |
| 2 | 38.2 | 3/12 |
| 3 | 53.3 | 0/12 |
| 4 | 52.7 | 0/12 |

The results for pigs from source No. 2 are shown below. In this instance, the pigs in treatement group No. 3 got only one treatment, because diarrhea did not recur until close to the end of the 60-day experiment.

Table X

| Treatment | Gain/Pig, Lbs. | Total Mortality |
|---|---|---|
| 1 | 12.5 | 11/12 |
| 2 | 30.5 | 1/12 |
| 3 | 35.7 | 0/12 |
| 4 | 31.9 | 0/12 |

In each instance, the pigs responded favorably to the treatment. Pigs from source No. 2 did not respond as well at the lower treatment levels as did the animals from source No. 1. Some of the pigs on the 4 mg./kg./day treatment from source No. 2 continued to exhibit some signs of dysentery until the second treatment.

Example 9

This test was conducted in much the same fashion as was the test of Example 8. The treatement with apramycin sulfate had the following results. In each instance, treatment was continued for three days.

Table XI

| Treatment | Final Wt./ Pig, Lbs. | Total Mortality | Colon Lesions |
|---|---|---|---|
| None | 17.8 | 8/11 | 11/11 |
| About 4 mg./kg./day | 36.5 | 6/11 | 8/11 |
| About 10 mg./kg./day | 28.0 | 2/11 | 8/11 |
| About 20 mg./kg./day | 45.0 | 1/11 | 3/11 |

The efficacy of apramycin in reducing mortality caused by swine dysentery and in maintaining weight gains despite infection with swine dysentery is quite clear from the above examples.

I have also conducted tests to show the efficacy of apramycin in the prevention and treatment of swine salmonellosis. The examples immediately below are reports of such tests.

The conditions of examples 10 through 15 were essentially the same. Weaned pigs from 4 to 8 weeks of age were allotted into groups so that the average pig weight of each group was approximately equal. The apramycin-medicated pigs were put on apramycin-containing feed, and a few days thereafter all of the pigs were challenged with a dose of 10-20 ml. of a tryptose broth culture of *Salmonella choleraesuis*, Strain A. Treatment with apramycin was continued for about 25 days, which period varied from test to test. At the end of that time all pigs were individually weighed and surviving pigs were examined for colon lesions. Apramycin was supplied as the lauryl sulfate salt in each test.

Example 10

| Treatment | Gain/Pig, Lbs. | Total Mortality |
|---|---|---|
| None | −1.8 | 6/12 |
| About 14 mg./kg./day | 5.8 | 4/12 |

This test was terminated at 25 days.

Example 11

| Treatment | Gain/Pig, Lbs. | Total Mortality |
|---|---|---|
| None | 4.5 | 8/12 |
| About 14 mg./kg./day | 7.8 | 5/12 |

This test was also terminated at 25 days.

Example 12

This test was performed with slightly older and heavier pigs than were used in the two examples above. The test ran for 35 days.

| Treatment | Gain/Pig, Lbs. | Total Mortality |
|---|---|---|
| None | 10.8 | 9/12 |
| About 7 mg./kg./day | 25.6 | 0/12 |

Example 13

| Treatment | Gain/Pig, Lbs. | Total Mortality |
|---|---|---|
| None | 5.2 | 1/14 |
| About 7 mg./kg./day | 24.9 | 1/14 |

This test ran for 22 days.

Example 14

| Treatment | Gain/Pig, Lbs. | Total Mortality |
|---|---|---|
| None | −7.6 | 8/12 |
| About 3.5 mg./kg./day | 6.4 | 1/12 |
| About 7 mg./kg./day | 8.5 | 2/12 |

Example 15

| Treatment | Gain/Pig, Lbs. | Total Mortality |
|---|---|---|
| None | 0.6 | 2/12 |
| About 1.8 mg./kg./day | 6.4 | 1/12 |
| About 3.5 mg./kg./day | 4.7 | 1/11[1] |

[1]One pig in this group died of a stomach ulcer not related to the treatment or the the challenge.

The efficacy of apramycin in the prevention of swine salmonellosis is extremely clear from the above examples. In each test, the apramycin-treated swine made better gains than did infected control swine. In the tests where a highly virulent challenge was experienced, apramycin reduced mortality markedly.

Apramycin has also been shown to be effective in the treatment of swine salmonellosis.

Example 16

Swine which had broken out into clinical illness induced by *S. choleraesuis* were treated with apramycin sulfate in their water. The water treatment was continued for 5 days, and the pigs were observed for several weeks following the challenge and treatment.

| Treatment | Final Avg. Wt. | Mortality | Colon Lesions |
|---|---|---|---|
| None | 31.7 | 5/12 | 10/12 |
| About 4 mg./kg./day | 32.6 | 4/12 | 8/12 |
| About 10 mg./kg./day | 32.8 | 1/12 | 4/12 |

The above data clearly shows the lessened mortality caused by treatment with apramycin of salmonellosis-ill swine. In this test, no significant weight gain improvement was observed.

In order to help those skilled in the animal husbandry art to practice my invention, methods of administration of apramycin will be discussed. I do not imply that the methods of administration are any part of my invention; they are conventional. My invention is a method of improving swine performance by the administration of apramycin. All methods of administration are equally effective in my method, although some methods are more practical than others in the several embodiments of my method.

The best methods of administration of apramycin for the promotion of growth in healthy pigs and for the prevention of salmonellosis and swine dysentery are essentially the same. In each case, the objective is to administer an effective dose of apramycin daily for a relatively long period of time. It is not implied that apramycin is not effective for the promotion of growth, or for the prevention of disease, when administered for a short period of time such as several days, but in order to derive the optimum benefits from the administration of apramycin, administration for from a few weeks to several months is usually indicated.

Administration of apramycin by daily injection or oral single-dose forms is quite costly over such long periods of time. Therefore, administration in the swine's feed or drinking water is most practical for growth promotion and disease prevention.

On the other hand, when apramycin is to be used for treatment of pigs sick with salmonellosis or dysentery, it is usually not very practical to mix apramycin in the swine's feed, because typically the swine are not eating. Also, the length of time required to mix feed after it is learned that an outbreak of disease has occurred is likely to be quite costly. It is much more practical to administer apramycin for treatment in the water of the swine. When swine are ill, an increased thirst often occurs, so that they are most likely to accept treatment.

Since disease treatment is carried out over a short period of from about one to about 14 days, administration of apramycin by injection or oral dosage forms such as tablets, capsules, liquids, and drenches is practical. If the swine are so ill as to be collapsed, such methods are the only ones possible.

Apramycin is effective when injected into the swine. If injection is to be used, it is most simple to use apramycin in the form of a water-soluble salt, such as the sulfate. However, it is entirely possible to use other salts or apramycin base and dissolve or suspend the antibiotic compound in a conventional injectable formulation. Such injectable formulations are very well known in the veterinary pharmaceutical art, and are composed of physiologically acceptable solvents and buffers.

Injectable suspensions employ a nonsolvent for the apramycin as a diluent. Depending on the form of apramycin chosen, the nonsolvent can be, for example, a vegetable oil such as peanut oil, corn oil, or sesame oil, a glycol such as one of the polyethylene glycols, or water.

Suitable physiologically acceptable adjuvants are necessary in order to keep the apramycin suspended. The adjuvants can be chosen from among the thickeners, such as carboxymethylcellulose, polyvinylpyrrolidone, gelatin, and the alginates. Many classes of surfactants serve to suspend apramycin. For example, lecithin, alkylphenol polyethylene oxide adducts, naphthalenesulfonates, alkylbenzenesulfonates, and the polyoxyethylene sorbitan esters are useful for suspending apramycin in liquid nonsolvents.

In addition many substances which affect the hydrophilicity, density, and surface tension of the liquid can assist in making injectable suspensions in individual cases. For example, silicone anti-foams, glycols, sorbitol, and sugars can be useful suspending agents.

When apramycin is administered percutaneously, it enters the pig's system by being dissolved in physiological fluids. It is possible to delay or sustain entry into the parts of the system where apramycin is physiologically active by proper formulation. For example, a very insoluble form of apramycin may be chosen. In that event, the slight solubility of the compound causes sustained action because the fluids of the pig can hold only a small amount of apramycin at any one time.

Sustained action of apramycin can also be obtained by formulating the compound in a matrix which will physically inhibit dissolution. The formulated matrix is administered to the pig by injection into a part of the body where it remains as a depot from which apramycin slowly dissolves.

Matrix formulations are now well known in the pharmaceutical art. They can be formulated in waxy, hydrophobic semisolids such as vegetable waxes and high molecular weight polyethylene glycols.

*Remington's Pharmaceutical Sciences* (14th ed. 1970), 1,714–28 gives further detail on formulation of injectable formulations.

Another way to delay absorption of a large dose of apramycin is to encapsulate it in an implant. Such implants comprise a capsule or pellet with an outer wall of a physiologically acceptable, permeable membrane such as silicone rubber or silicone-containing plastics. The active compound is placed inside the capsule or pellet, and the capsule or pellet is surgically implanted in the animal. The physiological fluids of the animal slowly leach the apramycin from the capsule or pellet through its permeable wall. Such implants can be designed to delay the availability of the apramycin contained therein for any reasonable period. Variations in the formulation of the membranes used to form the implant, and in the thickness of the membranes, are used to vary the length of time over which the apramycin becomes available to the animal.

It is also entirely possible to administer apramycin for growth promotion or for disease prevention in the form of oral pharmaceutical dosage forms such as drenches, capsules, tablets, and the like. Such dosage forms have the obvious disadvantage of difficulty of administration to the animal, especially when the animal grows close to market size. However, should such dosage forms be desirable, it is practical to formulate apramycin in such ways, and to administer such dosage forms to swine.

It is easy to formulate apramycin into tablets by the methods which are standard in the art. It is compatible with the normally used range of excipients and lubricants, and the heating which is incident to compression of a tablet does not damage apramycin. Apramycin can, of course, be filled into capsules if it is desired to do so; the filling of capsules is a simple mechanical operation which has no effect on the compound being filled therein.

If apramycin is to be administered for the treatment of swine dysentery and salmonellosis in the form of a drench, then the practitioner needs only to compute the proper amount of apramycin, most conveniently in the form of a water-soluble salt, dissolved or suspend the apramycin in an appropriate amount of water for the size pig to be drenched, and administer the drench in the usual fashion. The solvents and suspending agents discussed under injectable formulations are also useful in formulating drenches.

The administration of apramycin in the drinking water of the swine is also simple. It is necessary only to compute the approximate amount of water that the swine drink, and to dissolve or suspend the proper amount of apramycin in the water. It is easy to choose a water-soluble salt of apramycin for this purpose. If such a salt is not desired, then a suspendable formulation of apramycin must be made. The formulation can consist of a suspension in the concentrated form, which is mixed into the drinking water, or can consist of a dry preparation which is mixed and suspended in the drinking water. In either event, the apramycin to be used must be in a finely powdered form; the same types of surfactants and suspending agents can be used that were described above under injectable suspension products.

The formulation of veterinary drugs in feed is an extremely well-known art. It is usual to formulate the drug first as a premix in which the drug is dispersed in liquid or particulate solid carrier. The premix may conveniently contain from about 1 to about 400 g. of drug per pound, depending on the concentration desired in the feed. The premix is formulated into feed by being dispersed in the feed in a conventional horizontal or vertical mixer. The process of mixing veterinary drugs into animals' feed is a simple one of computing the correct amount of drug per ton of feed to be offered to the animals, and blending in any economically appropriate type of solids mixer or blender.

I do not believe or claim that any of the methods of administration or of formulation of apramycin which I disclose are novel. Neither do I claim that the methods of administration or of formulation are an integral part of my method. The methods of administration and formulation are entirely conventional. My method comprises the administration, by any effective means, of apramycin or its nontoxic addition salts for growth promotion of swine or for the prevention and treatment of certain diseases. However apramycin may be formulated or administered, its administration for such purposes remains my invention.

Swine, like most other economic animals, are treated with feed additives and drugs during most of their lives for prevention of disease, promotion of growth, and treatment of diseases. Apramycin can be administered as part of such combination regimes.

My method of swine performance improvement will prevent or treat other diseases of swine besides salmonellosis and dysentery. For example, it will prevent and treat colibacillosis diseases which afflict recently weaned swine. One such disease is edema disease, which usually occurs shortly after weaning, but may extend to 4 months of age. It appears to be caused by a toxin produced by *E. coli*. It usually occurs suddenly in a herd, and causes from 10 percent to 35 percent losses from edema of the viscera and paralysis.

An *E. coli* - caused scours also causes losses among weaned pigs. It does not cause many deaths, but damages performance by stopping weight gains during its 1 to 4 week course. Apramycin administration will prevent and treat this scours.

I claim:

1. A method of treating swine dysentery of weaned swine which comprises the administration of a curative amount of apramycin or a physiologically acceptable salt thereof to the swine.

2. A method of claim 1 in which apramycin sulfate is administered.

3. A method of claim 1 in which apramycin lauryl sulfate is administered.

4. A method of claim 1 in which swine dysentery is treated by the administration of from about 1.0 mg./kg./day to about 500 mg./kg./day of apramycin or its physiologically-acceptable salts.

5. A method of claim 4 in which swine dysentery is treated by the administration of from about 2.5 mg./kg./day to about 100 mg./kg./day of apramycin or its physiologically acceptable salts.

* * * * *